(12) United States Patent
Park et al.

(10) Patent No.: US 8,121,660 B2
(45) Date of Patent: Feb. 21, 2012

(54) SEMI-AUTOMATICALLY SLIDING MOBILE TERMINAL

(75) Inventors: Sang Chun Park, Suwon-si (KR); Jin Kyu Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 504 days.

(21) Appl. No.: 12/332,640

(22) Filed: Dec. 11, 2008

(65) Prior Publication Data

US 2009/0156275 A1    Jun. 18, 2009

(30) Foreign Application Priority Data

Dec. 12, 2007    (KR) ........................ 10-2007-0128624

(51) Int. Cl.
*H04M 1/00*    (2006.01)
(52) U.S. Cl. .................................................. 455/575.4
(58) Field of Classification Search ............... 455/575.4, 455/90
See application file for complete search history.

(56) References Cited

U.S. PATENT DOCUMENTS

| | | | | |
|---|---|---|---|---|
| 6,073,027 A | * | 6/2000 | Norman et al. | 455/575.4 |
| 6,282,436 B1 | * | 8/2001 | Crisp | 455/575.4 |
| 2003/0064688 A1 | * | 4/2003 | Mizuta et al. | 455/90 |
| 2006/0180457 A1 | * | 8/2006 | Han et al. | 200/550 |
| 2006/0234786 A1 | * | 10/2006 | Taniguchi et al. | 455/575.4 |
| 2007/0155451 A1 | * | 7/2007 | Lee | 455/575.4 |

* cited by examiner

*Primary Examiner* — Jean Jeanglaude
(74) *Attorney, Agent, or Firm* — H.C. Park & Associates, PLC

(57) ABSTRACT

A semi-automatically sliding mobile terminal includes a first main body, a second main body, a hinge unit, and a guide line. The second main body slides on the upper side of the first main body. The hinge unit includes a coupler coupled to the first main body and a spring unit compressing and expanding in a lateral direction. The guide unit includes a curved line having an ascending curved line, a crest, and a descending curved line that are formed in a longitudinal direction. When the second main body moves, the spring unit compresses or expands along the guide line. The spring unit compresses before passing over the crest and expands after passing over the crest. After the crest, the second main body moves semi-automatically due to elastic force of the spring unit.

15 Claims, 9 Drawing Sheets

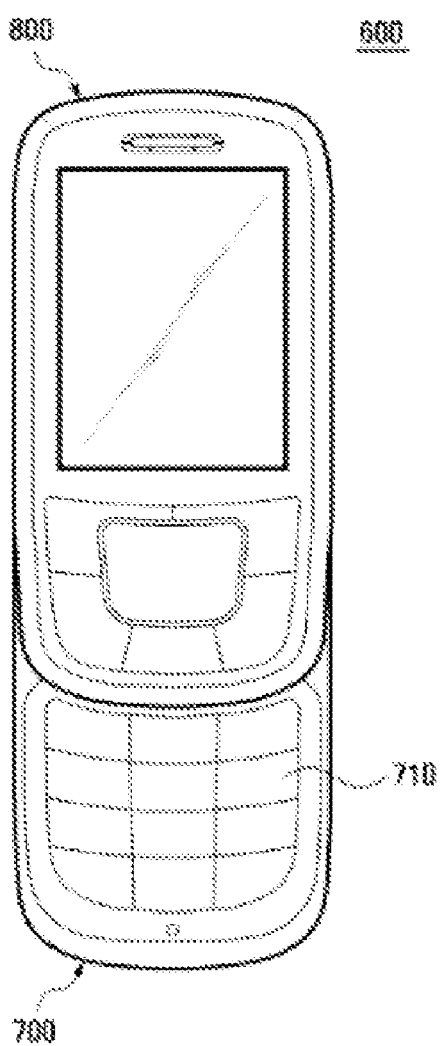
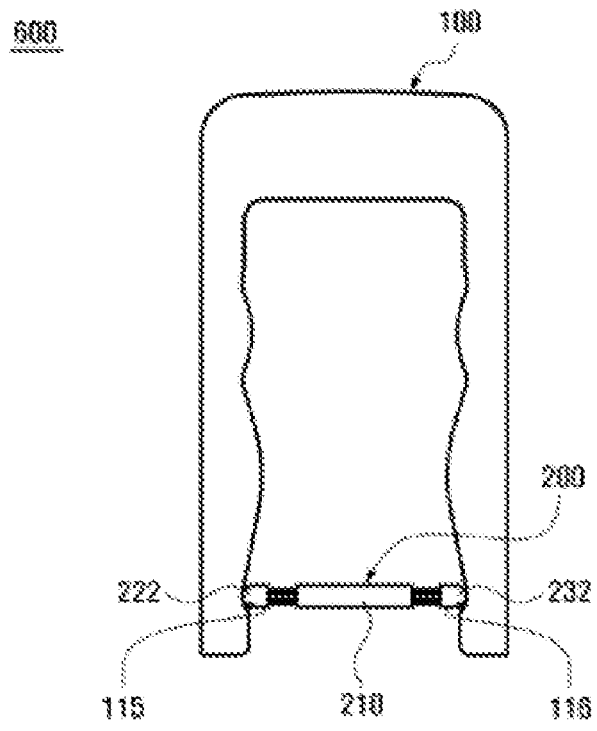
FIG.8A
FIG.8B

SEMI-AUTOMATICALLY SLIDING MOBILE TERMINAL

CROSS REFERENCE TO RELATED APPLICATION

This application claims priority from and the benefit of Korean Patent Application No. 10-2007-0128624, filed Dec. 12, 2007, which is hereby incorporated by reference for all purposes as if fully set forth herein.

BACKGROUND OF THE INVENTION

1. Field of the Invention

The present invention relates generally to a semi-automatically sliding mobile terminal and, more particularly, to a mobile terminal in which a second main body automatically slides after a user moves the second main body to a preset position.

2. Discussion of the Background

Generally, a mobile terminal is an electronic device that enables a user to use functions such as wireless communication and short-range wireless communication. The mobile terminal may be small so that it may be carried conveniently. A small mobile terminal may be manufactured by coupling a first main body with a second main body. According to the method in which the first main body with the second main body are coupled, there are various types of mobile terminals, generally, a folder type mobile terminal and a slide type mobile terminal. In the folder type mobile terminal, the first and second main bodies can be folded or unfolded about a hinge. In the slide type mobile terminal, the first and second main bodies are slidably coupled with each other. In the slide type mobile terminal, the first and second main bodies are slid open to use the mobile terminal and slid closed to end use of the mobile terminal.

In order to open the first and second main bodies of the slide type mobile terminal, a user should push the second main body until the mobile terminal is completely open. Thus, the mobile terminal may be inconvenient to use. In order to avoid this inconvenience, a mobile terminal may include a motor to slide the second main body installed in the mobile terminal. However, such a mobile terminal may be heavy, require high manufacturing costs, and malfunction easily.

SUMMARY OF THE INVENTION

The present invention provides a mobile terminal that may semi-automatically slide without using a motor.

The present invention also provides a lightweight and semi-automatically sliding mobile terminal that may have low manufacturing costs.

Additional features of the invention will be set forth in the description which follows, and in part will be apparent from the description, or may be learned by practice of the invention.

The present invention discloses a mobile terminal including a first main body, a hinge unit, a second main body, and a guide unit. The hinge unit includes a coupler and a spring unit. The coupler is coupled with an upper side of the first main body. The spring unit compresses and expands from the coupler in a lateral direction. The spring unit may include a spring and a support positioned at an end of the spring to contact the guide line. The second main body slides on the upper side of the first main body. The guide unit is coupled with a lower side of the second main body. The guide unit includes a guide line having a curved line. The curved line includes an ascending curved line, a crest, and a descending curved line that are formed in a longitudinal direction. The spring unit compresses and expands along the guide line during the movement of the second main body.

The present invention also discloses a mobile terminal including a first main body, a second main body to slide on an upper side of the first main body, a hinge unit, and a guide unit. The hinge unit includes a coupler coupled to a lower side of the second main body and a spring unit shrinking to and expanding from the coupler in a lateral direction. The guide unit is coupled to a lower side of the first main body and includes a guide line having a curved line. The curved line includes an ascending curved line, a crest, and a descending curved line that are formed in a longitudinal direction. The spring unit compresses and expands along the guide line during the movement of the second main body.

The present invention also discloses a mobile terminal including a first main body, a hinge unit, a second main body to slide on the upper side of the first main body, and a guide unit. The hinge unit includes a coupler coupled to an upper side of the first main body, and a first spring unit a second spring unit that can be compressed and expanded in a lateral direction. The guide unit is coupled to a lower side of the second main body, the guide unit comprising a U-shaped protrusion wherein opposite inner sides of the U-shaped protrusion are mirror images of each other. Each inner side has a peak between a first valley and a second valley. The spring unit compresses and expands along the opposite inner sides of the U-shaped protrusion during the movement of the second main body.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 7A, FIG. 7B, FIG. 8A, FIG. 8B, and FIG. 9A, FIG. 9B are views showing a semi-automatic slide of the mobile terminal according to an exemplary embodiment of the present invention.

DETAILED DESCRIPTION OF THE ILLUSTRATED EMBODIMENTS

Figure 1:
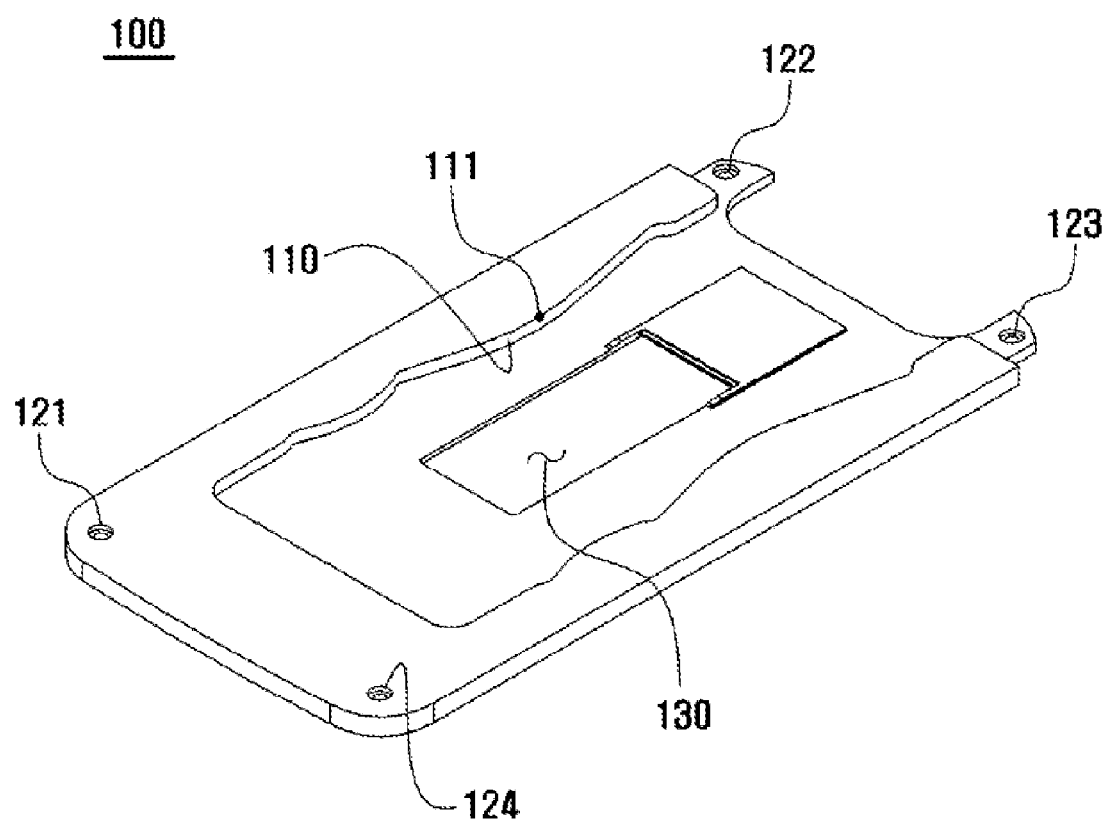
FIG. 1 is a perspective view showing a guide unit of a mobile terminal according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

FIG. 1 is a perspective view showing a guide unit of a mobile terminal according to an exemplary embodiment of the present invention.

As shown in FIG. 1, the guide unit 100 includes a guide line 110 having a curved line including an ascending curved line, a crest 111, and a descending curved line. The curved line may have various shapes such as a semi-oval, a semi-circle, and the like. A slope of a tangent line at the crest 111 of the guide line 110 is 0 (zero). Several curved lines may form the guide line 110. In the guide unit 100, the guide line 110 may be symmetric about the longitudinal central line.

The guide unit 100 is coupled to the lower side of a second main body such that the guide line 110 is exposed. The guide unit 100 may be coupled to the second main body by various methods. In this exemplary embodiment, the guide unit 100 is coupled to the second main body by fastening elements such as screws, nails, and the like. Thus, the guide unit 100 has fastening holes 121, 122, 123, and 124 in which the fastening elements are inserted. The fastening elements are inserted into the fastening holes 121, 122, 123, and 124 to couple the guide unit 100 to the second main body.

The guide unit 100 may have a hole 130 through which a flexible printed circuit board (FPCB) passes. The FPCB is used to connect a first main body to the second main body.

Figure 2:
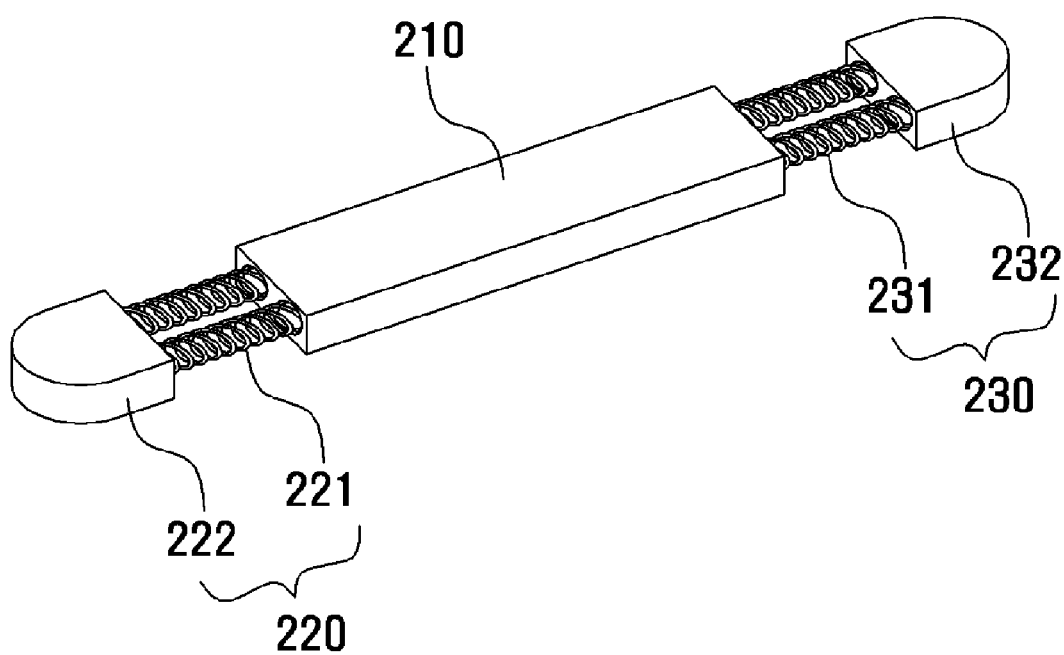
FIG. 2 is a perspective view showing a hinge of the mobile terminal according to an exemplary embodiment of the present invention.

FIG. 2 is a perspective view showing a hinge unit of the mobile terminal according to an exemplary embodiment of the present invention.

As illustrated in FIG. 2, the hinge unit 200 includes a coupler 210 and a spring unit 220. The coupler 210 is coupled to the upper side of the first main body. Thus, the hinge unit 200 is fixed to the first main body. The spring unit 220 may include a spring 221 and a support 222. The spring 221 may be compressed to and expand from the coupler 210 in the lateral direction of the guide unit 100. The spring 221 may easily be compressed and expanded in the lateral direction, but may not be easily compressed and expanded in the direction perpendicular to the lateral direction. The support 222 is positioned at an end of the spring 221 to directly contact the guide line 110. The coupler 200 may have two spring units 220 and 230 respectively at the lateral sides thereof. The two spring units 220 and 230 have springs 221 and 231, and supports 222 and 232, respectively.

Figure 3A:
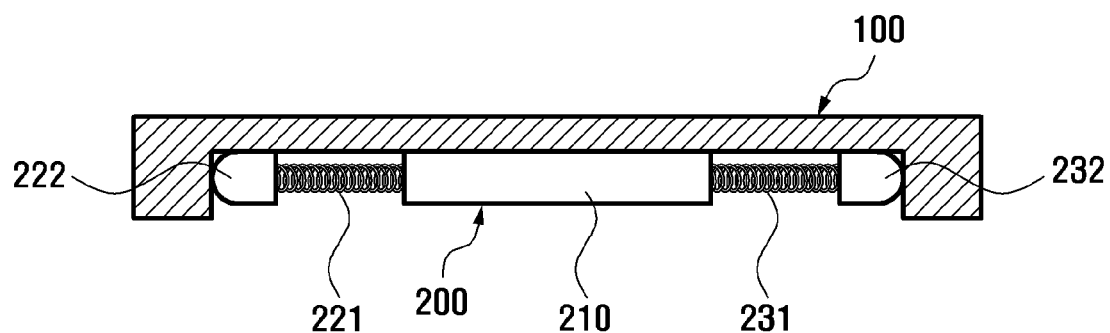
FIG. 3A is a sectional view showing the hinge unit positioned at the guide unit of the mobile terminal according to an exemplary embodiment of the present invention.

FIG. 3A is a sectional view showing the hinge unit 200 positioned in the guide unit 100.

As shown in FIG. 3A, the hinge unit 200 is positioned inside the guide unit 100. The coupler 210 of the hinge unit 200 is coupled to the upper side of the first main body. The supports 222 and 232 contact the guide line 110 of the guide unit 100 due to the elastic force of the springs 221 and 231. The guide unit 100 is coupled to the lower side of the second main body. The guide line 110 includes a protrusion 140 protruding from the end thereof. The protrusions 140 prevent the supports 222 and 232 from springing out due to the elastic forces of the springs 221 and 231.

Figure 3B:
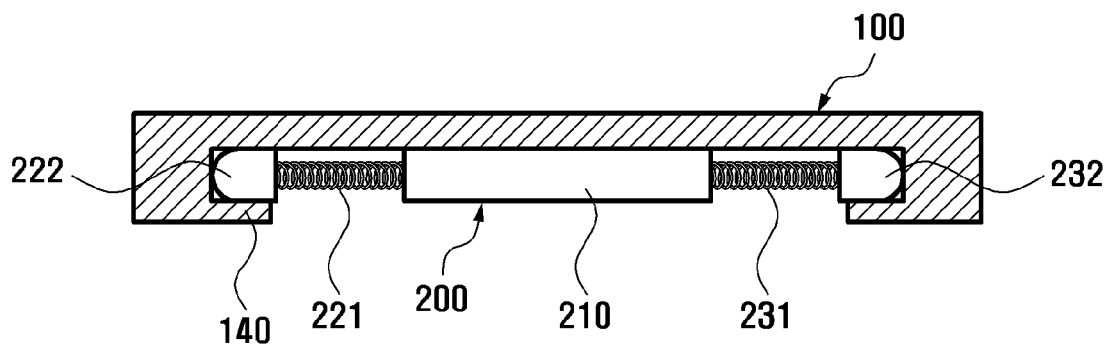
FIG. 3B is a sectional view showing the hinge unit positioned at an alternative guide unit of the mobile terminal according to an exemplary embodiment of the present invention.

FIG. 3B is a sectional view showing the hinge unit 200 positioned in an alternative guide unit 100.

As shown in FIG. 3B, the guide line 110 includes a protrusion 140 protruding from the end thereof. The protrusions 140 prevent the supports 222 and 232 from springing out due to the elastic forces of the springs 221 and 231.

FIG. 4A, FIG. 4B, FIG. 5A, FIG. 5B and FIG. 6A, FIG. 6B are views showing the semi-automatic sliding of the mobile terminal according to an exemplary embodiment of the present invention.

Figure 4A:
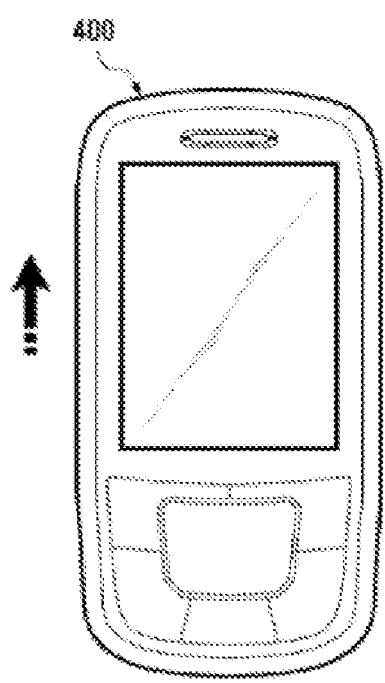
FIG. 4A, FIG. 4B, FIG. 5A, FIG. 5B and FIG. 6A, FIG. 6B are views showing a semi-automatic slide of the mobile terminal according to an exemplary embodiment of the present invention.
Figure 4B:
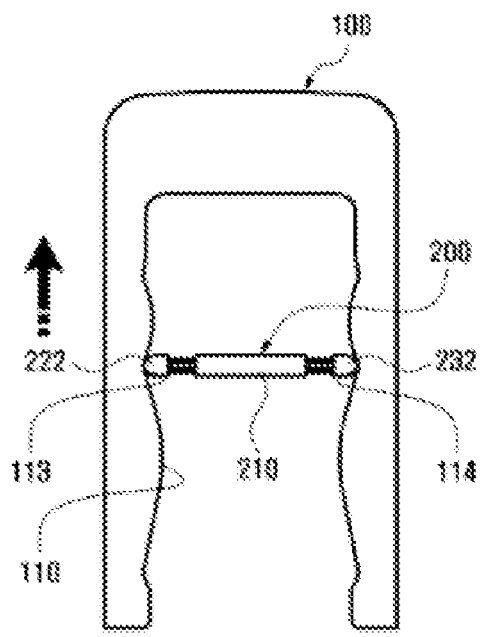

As shown in FIG. 4A, FIG. 4B, when the first main body 300 is coupled to the second main body 400, the supports 222 and 232 of the hinge unit 200 are respectively positioned in first and second locking recesses 113 and 114 between the continuous curved lines of the guide line 110. Thus, the hinge unit 200 maintains the stopped state unless an external force is applied thereto.

Figures 5A, 5B:
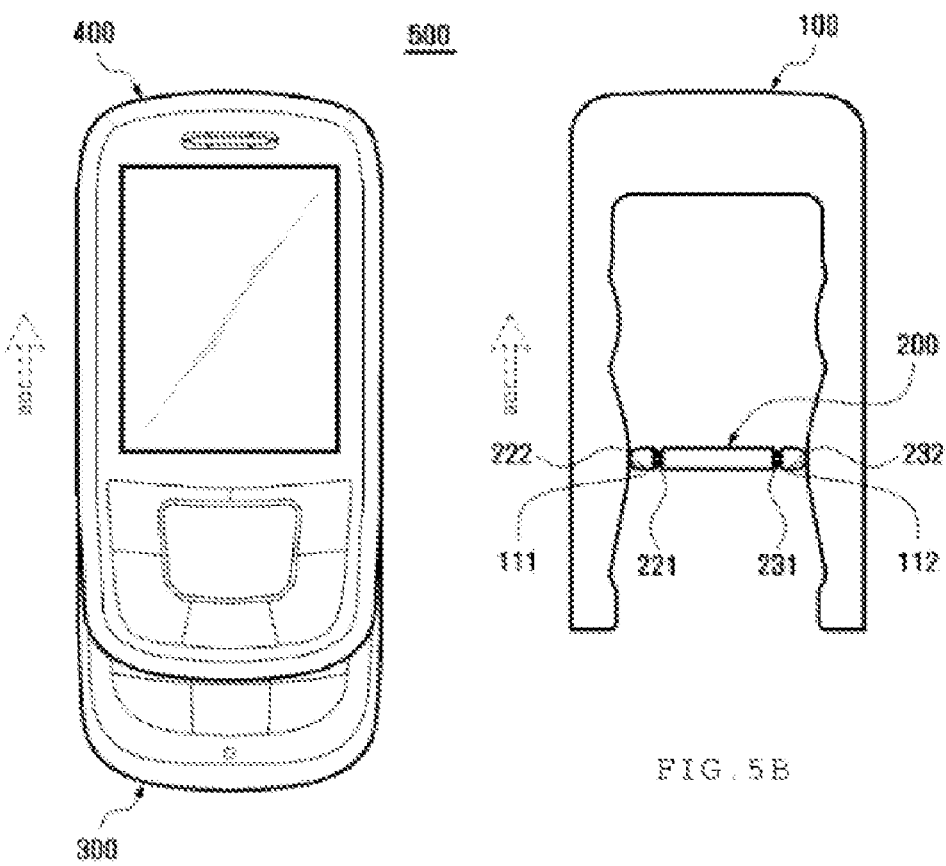

A user may move the second main body 400 in a first direction (an upward direction of the longitudinal direction in this exemplary embodiment) to use the mobile terminal 500. Since the first main body 300 is coupled with the coupler 210 of the hinge unit 200, the guide unit 100 coupled to the second main body 400 moves in the first direction. Thus, as shown in FIG. 5A, FIG. 5B, the supports 222 and 232 of the hinge unit 200 move along the ascending curved lines of the curved lines and the springs 221 and 231 are compressed. The compression of the springs 221 and 231 continues until the supports 222 and 232 pass over the crests 111 and 112. When the supports 222 and 232 have passed over the crests 111 and 112, the supports 222 and 232 move along the descending curved lines of the curved lines and the springs 221 and 231 expand due to the elastic forces thereof. The guide unit 100 automatically slides due to the elastic forces of the springs 221 and 231 and therefore the second main body 400 coupled to the guide unit 100 automatically slides.

Figures 6A, 6B:
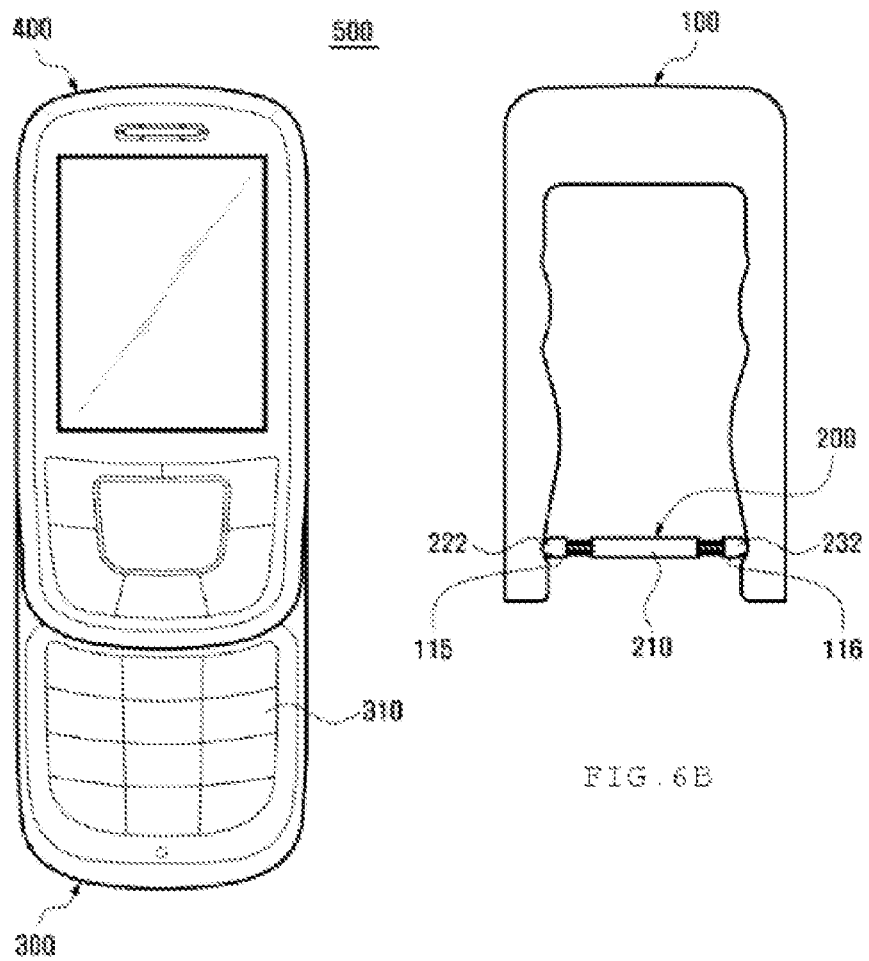

As shown in FIG. 6A, 6B, the automatic sliding of the second main body 400 is stopped when the supports 222 and 232 of the coupler 210 are positioned in second locking recesses 115 and 116. At this time, a key input unit 310 installed in the first main body 300 is completely exposed.

As described above, the mobile terminal 500 is open when the second main body 400 automatically slides after the user moves the second main body 400 until a preset position (where the supports 222 and 232 pass over the crests 111 and 112). When use of the mobile terminal 500 is complete and the second main body 400 is closed, the mobile terminal 500 operates opposite to the opening operation. In other words, when the second main body 400 is moved just to the preset position (where the supports 222 and 232 have passed over the crests 111 and 112), the second main body 400 automatically slides closed.

Although the supports 222 and 232 respectively pass over single curved lines in this exemplary embodiment, the supports 222 and 232 may pass over two or more curved lines in the first direction in another exemplary embodiment. In this case, the second main body of the mobile terminal may be opened through several operations. Moreover, when the slopes of the ascending lines and the descending lines of the curved lines are adjusted, the sliding range and speed of the second main body 400 may be adjusted.

FIG. 7A, FIG. 7B, FIG. 8A, FIG. 8B, and FIG. 9A, FIG. 9B show a mobile terminal according to another exemplary embodiment of the present invention semi-automatically sliding in first and second directions.

Figure 7A:
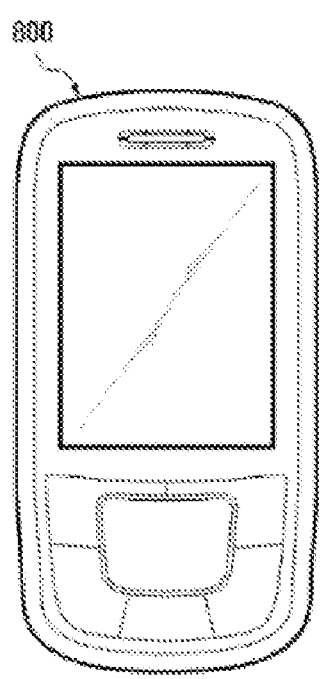
Figure 7B:
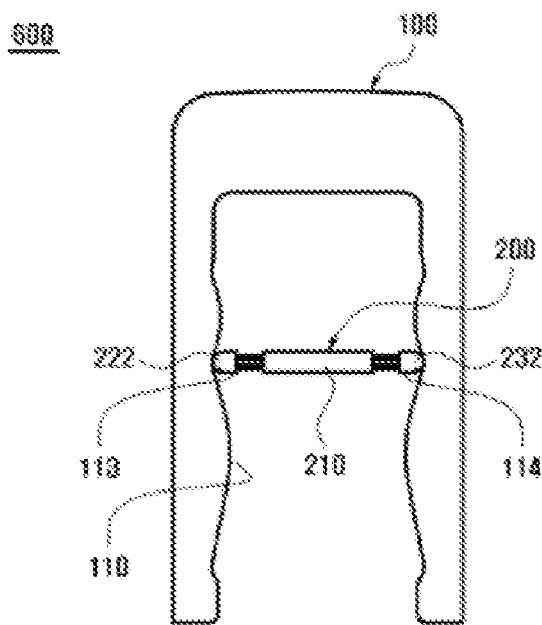

As shown in FIG. 7A, FIG. 7B, when a mobile terminal 600 is not being used, supports 222 and 232 of a hinge unit 200 are positioned in first locking recesses 113 and 114 between continuous curved lines of a guide line 110. Thus, unless an external force is exerted thereto, the hinge unit 200 maintains the stopped state.

In order to use a key input unit 710 installed in a first main body 700, the user moves a second main body 800 of the mobile terminal 600 in the first direction (an upward direction of the longitudinal direction in this exemplary embodiment). In this case, the operation of the mobile terminal 600 is the same as that of the mobile terminal described with reference to FIG. 3, FIG. 4A, FIG. 4B and FIG. 5A, FIG. 5B. When the second main body 800 stops, the key input unit 710 installed in the first main body 700, as shown in FIG. 8A, 8B, is completely exposed.

Figures 9A, 9B:
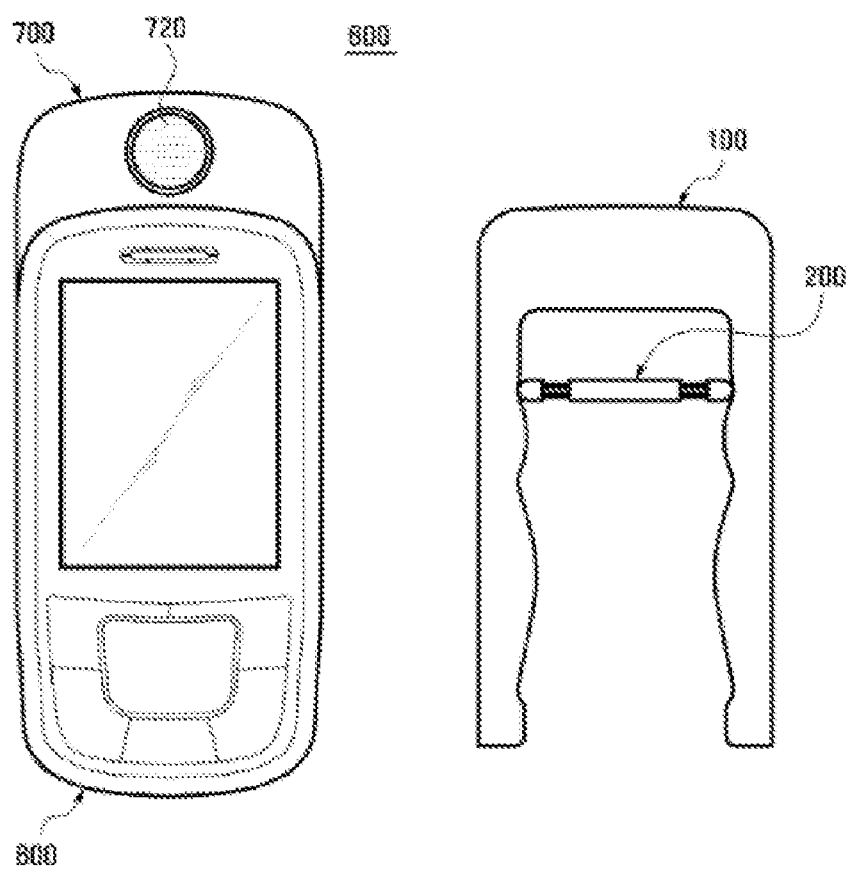

In order to use a speaker 720 installed in the first main body 700, the user moves the second main body 800 of the mobile terminal 600 in the second direction (downward direction of the longitudinal direction in this exemplary embodiment). The operation of the mobile terminal 600 is the same as that of the mobile terminal described with reference to FIG. 3, FIG. 4A, FIG. 4B and FIG. 5A, FIG. 5B except for the guide unit 100 moving in the second direction. When the second main body 800 stops, the speaker 720 installed in the first main body 700, as shown in FIG. 9A, FIG. 9B, is completely exposed.

In this exemplary embodiment, the hinge unit is coupled to or integrated with the first main body, and the guide unit is coupled to or integrated with the second main body. Alternatively, the hinge unit may be coupled to the second main body and the guide unit may be coupled to the first main body.

The mobile terminal described in the exemplary embodiments of the present invention means a portable electronic device such as a mobile phone, a personal digital assistant (PDA), a global positioning system (GPS), a navigation system, a digital broadcasting receiver, a portable multimedia player (PMP), and the like.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A mobile terminal, comprising:
   a first main body;
   a hinge unit comprising a coupler coupled to an upper side of the first main body and a spring unit that can be compressed and expanded in a lateral direction;
   a second main body to slide on the upper side of the first main body; and
   a guide unit coupled to a lower side of the second main body and comprising a guide line having a curved line, the curved line comprising an ascending curved line, a crest, and a descending curved line that are formed in a longitudinal direction;
   wherein the spring unit compresses and expands along the guide line during the movement of the second main body.

2. The mobile terminal of claim 1, wherein the spring unit is compressed as it moves along the guide line until passing over the crest along the ascending curved line, and expands as it moves along the guide line due to an elastic force during the movement thereof along the descending curved line.

3. The mobile terminal of claim 1, wherein the spring unit comprises:
   a spring; and
   a support positioned at an end of the spring and contacting the guide line.

4. The mobile terminal of claim 3, wherein the hinge unit comprises two spring units respectively provided at each side of the coupler, and the guide line is symmetric about the longitudinal central line.

5. The mobile terminal of claim 1, wherein the guide line further comprises protrusions protruding from ends thereof in the lateral direction.

6. The mobile terminal of claim 1, wherein the guide line comprises at least two continuous curved lines.

7. The mobile terminal of claim 6, wherein the second main body slides on the first main body in a first direction and a second direction.

8. The mobile terminal of claim 7, wherein the first main body comprises:
   a speaker provided at an end thereof in the first direction; and
   a key input unit provided at an end thereof in the second direction;
   wherein the key input unit of the first main body is exposed when the second main body moves in the first direction, and the speaker of the first main body is exposed when the second main body moves in the second direction.

9. The mobile terminal of claim 1, further comprising a fastener coupling the guide unit to the second main body.

10. The mobile terminal of claim 1, wherein the first main body is integrated with the hinge unit.

11. The mobile terminal of claim 1, wherein the second main body is integrated with the guide unit.

12. A mobile terminal, comprising:
    a first main body;
    a second main body to slide on an upper side of the first main body;
    a hinge unit comprising a coupler coupled to a lower side of the second main body and a spring unit compressing and expanding from the coupler in a lateral direction; and
    a guide unit coupled to a lower side of the first main body and comprising a guide line having a curved line, the curved line comprising an ascending curved line, a crest, and a descending curved line that are formed in a longitudinal direction;
    wherein the spring unit compresses and expands along the guide line during the movement of the second main body.

13. A mobile terminal, comprising:
    a first main body;
    a hinge unit comprising a coupler coupled to an upper side of the first main body and a spring unit that can be compressed and expanded in a lateral direction;
    a second main body to slide on the upper side of the first main body; and
    a guide unit coupled to a lower side of the second main body, the guide unit comprising a U-shaped protrusion wherein opposite inner sides of the U-shaped protrusion are mirror images of each other, each inner side comprising a peak between a first valley and a second valley and,
    wherein the spring unit compresses and expands along the opposite inner sides of the U-shaped protrusion during movement of the second main body.

14. The mobile terminal of claim 13, wherein the spring unit comprises a first spring unit having a first end coupled to a first end of the coupler, and a second spring unit having a first end coupled to a second end of the coupler, and
    wherein the hinge unit further comprises:
        a first support coupled to a second end of the first spring unit; and
        a second support coupled to a second end of the second spring unit,
    wherein the first support and the second support respectively contact the opposite inner sides of the U-shaped protrusion.

15. The mobile terminal of claim 14, wherein the first spring unit and the second spring unit are compressed as the guide unit moves along the U-shaped protrusion from the first valleys to the peaks, and expand as the guide unit moves along the U-shaped protrusion from the peaks to the second valleys.

\* \* \* \* \*